Dec. 22, 1931.   J. L. MATTHEWS   1,837,875
BEARING RETAINER
Filed March 15, 1930   2 Sheets-Sheet 2

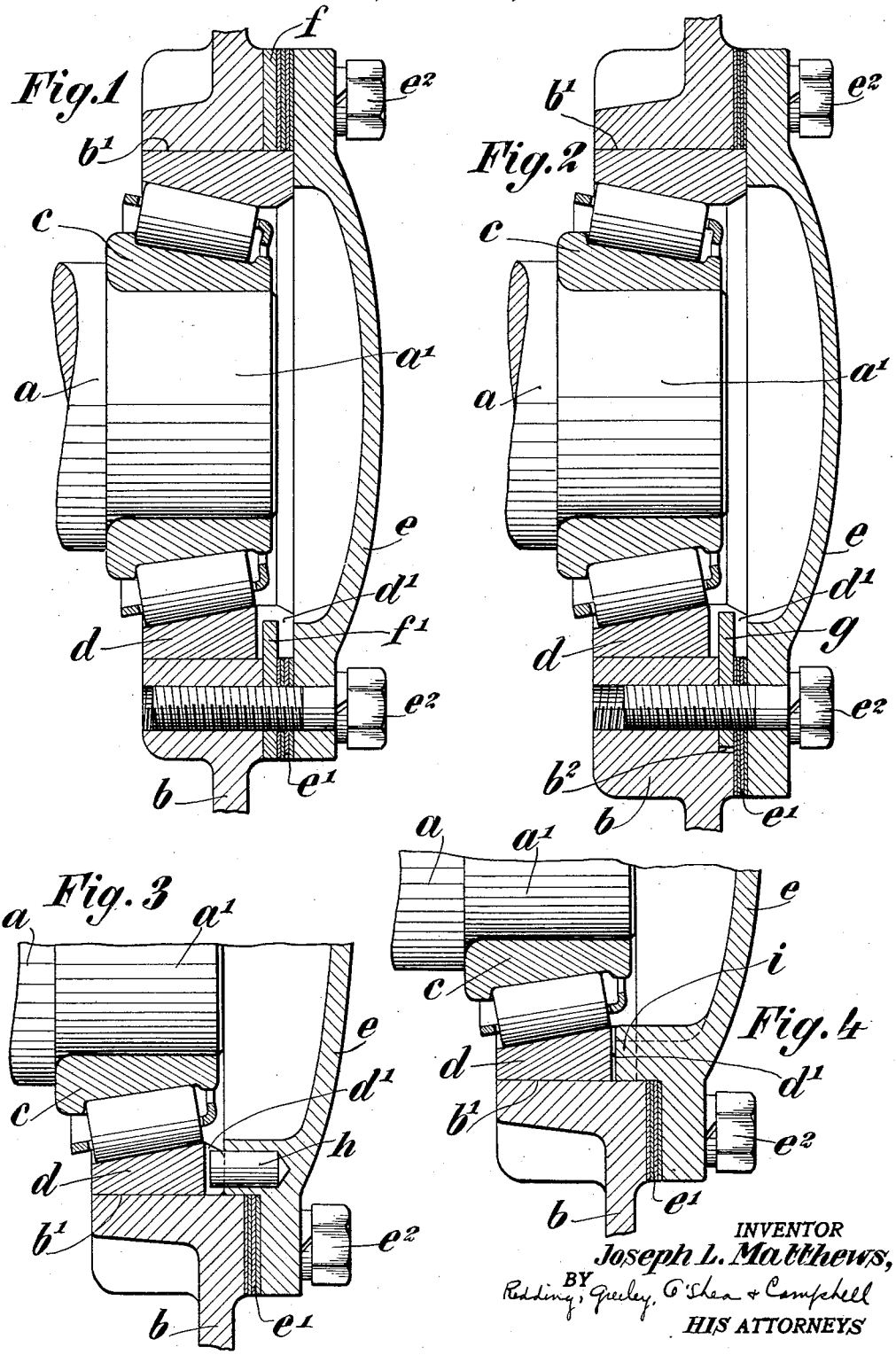

INVENTOR
Joseph L. Matthews,
BY
HIS ATTORNEYS

Patented Dec. 22, 1931

1,837,875

UNITED STATES PATENT OFFICE

JOSEPH L. MATTHEWS, OF HIGHLAND PARK, NEW JERSEY, ASSIGNOR TO INTERNATIONAL MOTOR COMPANY OF NEW YORK, N. Y., A CORPORATION OF DELAWARE

BEARING RETAINER

Application filed March 15, 1930. Serial No. 436,005.

The present invention relates to bearing retainers and embodies, more specifically, an improved bearing, the outer race of which is effectively secured against creeping or moving in its housing.

The tendency of the outer race of a roller or ball bearing to creep is well known and such creeping has heretofore been prevented by holding the outer cup of the bearing in a separate metallic retainer. While this structure is effective in preventing such undesirable movement of the outer cup, it requires an additional element which adds to the expense of the assembly and requires additional time in mounting.

The present invention seeks to provide an improved mounting for such outer bearing cups, by means of which the bearing assembly is greatly simplified, at the same time effectively preventing the creeping of the outer cup in its housing. Particularly in the mounting of tapered roller bearings is it important to prevent such creeping since a heavy thrust load is imposed on the outer cup which must necessarily be absorbed by the retaining plate or retainer. With this in view, the present invention provides a bearing retainer which not only provides the required locking of the outer cup of the bearing but is also simple of construction and readily mounted during the assembly of the bearing.

An object of the invention, accordingly, is to provide a retaining device for bearings of the above character by means of which the outer cup may be effectively anchored against movement.

A further object of the invention is to provide a device of the above character which is simple of construction and readily mounted during the bearing assembly.

Further objects, not specifically enumerated above, will be apparent as the invention is described in greater detail in connection with the accompanying drawings, wherein:

Figure 1 is a view in section, taken through the axis of a bearing and showing a retaining device constructed in accordance with the present invention.

Figure 2 is a view in section, similar to Figure 1, but showing a modified form of the invention.

Figure 3 is a segmental view in section, taken in a plane passing through the axis of a bearing and showing a further modified form of the invention.

Figure 4 is a view similar to Figure 3, showing a modified form of the invention as shown in Figure 3.

Referring to the above drawings, a shaft is indicated at $a$ having a stepped extremity $a'$ which is to be journaled in a supporting member $b$.

In the form of the invention shown herein, a tapered roller bearing has been illustrated and the inner bearing race thereof is indicated at $c$. The outer bearing race of such bearing is shown at $d$ and is adapted to be received within a suitably formed aperture $b'$ in the supporting member $b$. Sealing rings $e'$ are mounted under a cap $e$, the rings and cap being mounted upon the supporting member $b$ by means of bolts $e^2$.

In order that the outer cup may be secured in position against creeping and other movement, a slot $d'$ is formed therein, such slot receiving a finger $f'$ which is formed upon a ring $f$. This ring is mounted under the sealing rings $e'$ and secured in position by means of the bolts $e^2$ which pass therethrough and serve not only to secure the cap in position as an abutment for the outer bearing race, but also to mount the retaining ring $f$, the finger $f'$ of which engages the slot in the outer ring to prevent axial movement thereof in the supporting member.

In the form of the invention shown in Figure 2, the shaft and supporting member are as shown in Figure 1. Likewise, the inner and outer bearing rings are as shown in Figure 1, the slot $d'$ being shown in the outer ring as described in connection with Figure 1. The retaining ring $f$, however, of Figure 1, is dispensed with and a notched recess $b^2$ is formed in the supporting member $b$. This recess receives a squared dog $g$ which is received within the slot $d'$ and secured in position by means of one of the bolts $e^2$. It will readily be seen that the foregoing structure is similar in many respects to that described in connection with Figure 1, save that the retaining ring $f$ is supplanted by the dog $g$.

In the construction shown in Figure 3, the outer bearing race is again provided with a slot $d'$. In this construction, however, the retaining ring $f$ and dog $g$, described in connection with Figures 1 and 2, are dispensed with and a pin $h$ mounted within the cap $e$. This pin extends within the slot $d'$ and serves to secure the outer cup in position, as described above.

In the form of the invention shown in Figure 4, the outer cup is again provided with a slot $d'$ and the cap $e$ formed with an inwardly extending lug $i$ which is received within the slot $d'$. This lug functions similarly to the pin $h$ to prevent displacement of the outer cap as described above.

Figure 5:
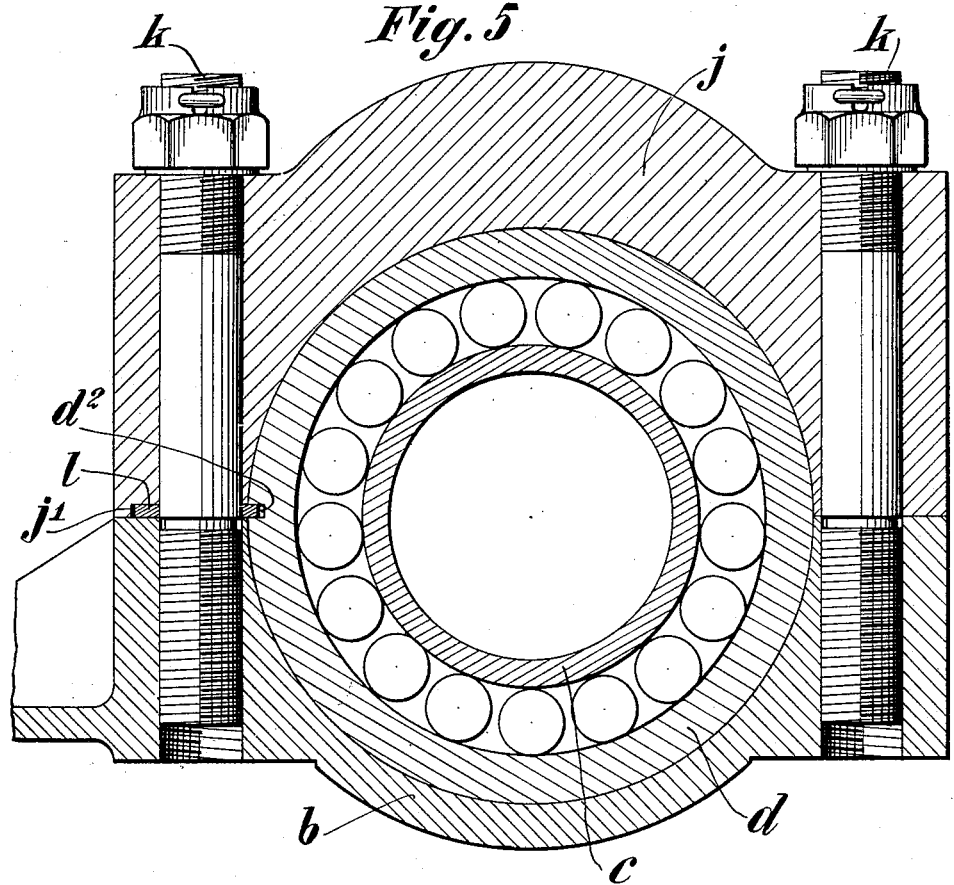
Figure 5 is a view in section, taken in a plane transverse to the axis of a bearing and showing the same provided with a retaining device constructed in accordance with the present invention.
Figure 6:
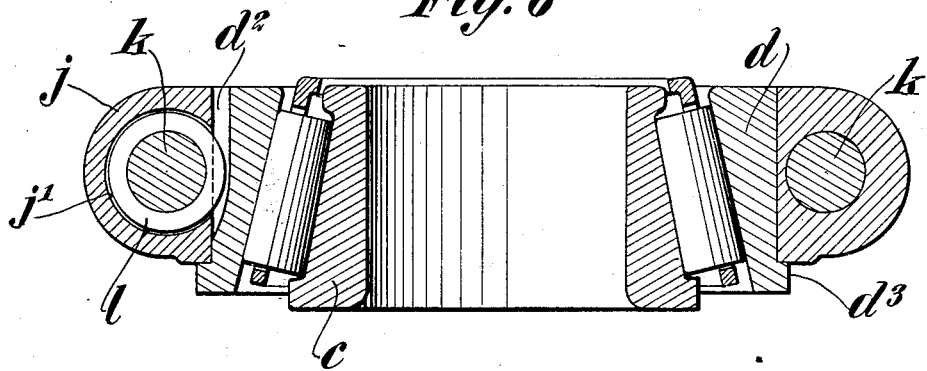
Figure 6 is a view in section, showing the form of the invention illustrated in Figure 5 and taken on a plane passing through the axis of the bearing.

In the form of the invention shown in Figure 5, the supporting member $b$ is shown as mounting a strap or positioning member $j$ which secures the outer cup $d$ in position. Bolts $k$ pass through the strap $j$ and secure the same to the mounting member $b$, as clearly shown in Figure 5.

A shoulder $d^3$ is formed on the outer cup to engage the supporting member and strap and thus transmit the axial thrust of the bearing thereto. Upon the periphery of the outer cup, a longitudinal groove $d^2$ is formed, such groove receiving a washer $l$ which is mounted over one of the bolts $k$. This washer is preferably received within a recess $j'$, formed in the strap $j$ and thus is readily positioned during the assembly of the bearing to prevent rotative movement of the outer cup in a manner which will be readily apparent.

From the foregoing it will be seen that the outer cup is effectively held against creeping and other displacement in the supporting member and the structure is of such character that it may be readily manufactured and assembled, thus requiring an unappreciable outlay over existing forms of bearings.

While the invention has been described with specific reference to the accompanying drawings, it is not to be limited, save as defined in the appended claims.

I claim as my invention:

1. In a device of the character described, a supporting member, a member journaled therein, an outer bearing race mounting the second member in the first, said race being formed with a recess, a retaining means secured to the first member, bolts securing the retaining means to the first member, and a washer carried by one of the bolts for engaging the recess.

2. In a device of the character described, a supporting member, a member journaled therein, an outer bearing race mounting the second member in the first, said race being formed with a recess, a retaining means secured to the first member, and means mounted with the retaining means for engaging the recess.

3. In a device of the character described, a supporting member, a member journaled therein, an outer bearing race mounting the second member in the first, said race being formed with a recess, and a washer carried by the first member to engage the recess.

This specification signed this 11th day of March A. D. 1930.

JOSEPH L. MATTHEWS.